United States Patent
Johnson et al.

(10) Patent No.: US 6,479,082 B1
(45) Date of Patent: *Nov. 12, 2002

(54) PROCESS OF INCREASING FLAVOR RELEASE FROM CHEWING GUM USING HYDROXYPROPYL CELLULOSE AND PRODUCT THEREOF

(75) Inventors: Sonya S. Johnson, LaGrange Highlands; Robert J. Yatka, Orland Park; Michael J. Greenberg, Northbrook, all of IL (US)

(73) Assignee: Wm. Wrigley, Jr. Co., Chicago, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 10 days.

(21) Appl. No.: 09/331,710
(22) PCT Filed: Dec. 23, 1996
(86) PCT No.: PCT/US96/20328
  § 371 (c)(1),
  (2), (4) Date: Jun. 23, 1999
(87) PCT Pub. No.: WO98/27826
  PCT Pub. Date: Jul. 2, 1998

(51) Int. Cl.⁷ .................................................. A23G 3/30
(52) U.S. Cl. ................................................. 426/3
(58) Field of Search ................................ 426/3, 6, 5

(56) References Cited

U.S. PATENT DOCUMENTS

| | | | |
|---|---|---|---|
| 4,159,316 A | 6/1979 | Januszewski et al. | 424/49 |
| 4,259,355 A | 3/1981 | Marmo et al. | 426/5 |
| 4,460,563 A | 7/1984 | Calanchi | 424/35 |
| 4,564,529 A | 1/1986 | Watson et al. | 426/570 |
| 4,680,323 A | 7/1987 | Lowey | 524/43 |
| 4,765,991 A * | 8/1988 | Cherukuri et al. | 426/3 |
| 4,766,012 A | 8/1988 | Valenti | 424/461 X |
| 4,810,501 A | 3/1989 | Ghebre-Sellassie et al. | 424/469 |
| 4,980,177 A * | 12/1990 | Cherukuri et al. | 426/3 |
| 5,098,715 A | 3/1992 | McCabe et al. | 424/479 |
| 5,128,155 A * | 7/1992 | Song | 426/5 |
| 5,139,794 A | 8/1992 | Patel et al. | 426/3 |
| 5,154,927 A | 10/1992 | Song et al. | 424/440 |
| 5,192,563 A * | 3/1993 | Patel et al. | 426/5 |
| 5,227,182 A | 7/1993 | Song et al. | 426/5 |
| 5,326,574 A | 7/1994 | Chapdelaine et al. | 426/5 |
| 5,496,541 A * | 3/1996 | Cutler | 426/3 X |
| 5,549,917 A | 8/1996 | Cherukuri et al. | 426/96 |

FOREIGN PATENT DOCUMENTS

| | | |
|---|---|---|
| EP | 0 320 522 A1 | 6/1989 |
| EP | 0 427 796 B1 | 5/1991 |
| EP | 0 492 981 B1 | 7/1992 |
| WO | 87/03453 | 6/1987 |
| WO | 94/01002 | 1/1994 |
| WO | 94/14330 | 7/1994 |
| WO | 98/27826 | 7/1998 |

\* cited by examiner

*Primary Examiner*—Arthur L. Corbin
(74) *Attorney, Agent, or Firm*—Steven P. Shurtz; Brinks Hofer Gilson & Lione

(57) ABSTRACT

The present invention is a method of increasing the flavor release of chewing gum using hydroxypropyl cellulose, as well as the chewing gum containing hydroxypropyl cellulose and having increased flavor release. The increase in flavor release is obtained by incorporating hydroxypropyl cellulose in a powder form directly into the chewing gum composition.

20 Claims, No Drawings

PROCESS OF INCREASING FLAVOR RELEASE FROM CHEWING GUM USING HYDROXYPROPYL CELLULOSE AND PRODUCT THEREOF

FIELD OF THE INVENTION

This invention relates generally to chewing gum products made from a chewing gum composition and, in particular, to chewing gum products which utilize hydroxypropyl cellulose to increase the flavor release in chewing gum compositions.

BACKGROUND OF THE INVENTION

The use of hydroxypropyl cellulose (or HPC) as a film coating media for a variety of encapsulated products is known in the art. Sweeteners, flavors and other ingredients have been encapsulated with various water-soluble cellulosics, including hydroxypropyl cellulose, and then used in chewing gum in order to modify the release of the encapsulated material.

Chewing gum compositions typically include gum base, flavoring and bulking and sweetening agents, as well as other optional ingredients such as softeners and coloring. As gum is chewed for an extended period of time, the taste sensation is reduced, thereby resulting in the impression that the gum has lost most of its flavor. In reality, most of the original flavor, about 70 to about 90 percent, is still present in the chewing gum. A need, therefore, exists for a method of increasing the amount of flavor released from chewing gum compositions as they are chewed over a period of time.

SUMMARY OF THE INVENTION

According to the present invention, it has now been discovered that the use of low levels of hydroxypropyl cellulose (HPC) in mint-flavored chewing gum increases the amount of flavor released from the chewing gum resulting in the impression of a stronger flavor. Analytical tests have shown that levels from about 0.2 percent to about 1 percent HPC in gum significantly increase the release rate of menthol and menthone. The result is a chewing gum product with a stronger mint flavor. Also, the increase in the flavor release when HPC is used in chewing gum means that less flavor need be used to give the impression of the usual flavor level.

The present invention thus includes a chewing gum product having increased flavor release comprising from about 5% to about 95% by weight gum base. from about 5% to about 95% by weight bulking and sweetening agents, from about 0.1% to about 15% by weight flavor, and from about 0.005% to about 1% by Weight hydroxypropyl cellulose in its natural, or powder, form. The present invention also includes a method of increasing the release of flavor in chewing gum compositions comprising the step of adding hydroxypiopyl cellulose to the chewing gum composition. Finally, the present invention includes a method of making a chewing gum product having an increased flavor release comprising the steps of forming a chewing gum composition comprising from about 5% to about 95% gum base, from about 5% to 95% bulking and sweetening(g agents and from about 0.1% to about 15% flavor, and adding from about 0.005% to about 1% hydroxypropyl cellulose in its powder form directly to the chewing gum composition)

The foregoing and other features and advantages will become apparent from the following detailed description of the presently preferred embodiments, when read in conjunction with the accompanying examples.

DETAILED DESCRIPTION OF THE PRESENTLY PREFERRED EMBODIMENTS

As used herein, the term "chewing gum" includes all types of gum compositions, including sugar and sugarless chewing gum, bubble gum and the like.

All percentages used herein are weight percentages unless other vise specified.

In general, a chewing gum composition typically comprises a water-soluble bulk portion, a water-insoluble chewable gum base portion and one or more water-insoluble flavoring agents. Tile water-soluble portion dissipates with a portion of the flavoring agent over a period of time during chewing. The gum base portion is retained in the mouth throughout the chewing process.

The insoluble gum base generally includes elastomers, elastomer plasticizers (resins), fats and oils, waxes, softeners and inorganic fillers. The clastomers may include polyisobutylenle, isobutylene-isoprene copolymer, styrene butadiene rubber and natural latexes such as chicle. The resins may include polyvinylacetate and terpene resins. Low molecular weight polyvinlylacetate is a preferred resin Fats and oils may include tallow, soybean and cotton seed oils, hydrogenated and partially hydrogenated vegetable oils and cocoa butter. Commonly used waxes include paraffin, microcrystalline and natural waxes such as beeswax, candellia, camauba and polyethylene wax. According to the preferred embodiment of the present invention, the insoluble gum base constitutes between about 5 and about 95 percent by weight of the gum. More preferably the insoluble gum base comprises between about 10 and about 50 percent by weight of the gum and most preferably between about 20 and about 35 percent by weight of the gum.

The gum base typically also includes a filler component. The filler component may be calcium carbonate, magnesium carbonate, talc, dicalcium phosphate and the like. The filler may constitute between about 5 and about 60 percent by weight of the gum base. Preferably, the filler comprises between about 5 and about 50 percent by weight of the gum base.

Gum bases typically also contain softeners, including glycerol monostearate and glycerol triacetate. Further, gum bases may also contain optional ingredients such as antioxidants, colors and emulsifiers. The present invention contemplates employing any commercially acceptable gum base.

The water-soluble portion of the chewing gum contains bulking and sweetening agents. In sugar gums, sucrose is typically both the bulking agent and the sweetening agent. Other sugar sweeteners include dextrose, maltose, dried invert sugar, fructose, levulose, galactose, corn syrup solids, glucose sugar and the like, alone or in combination In sugarless gums, the bulking and sweetening agents usually include sorbitol, mannitol, xylitol, hydrogenated starch hydrolysates, maltitol and the like, alone or in combination.

The bulking and sweetening agents usually comprise from about 30 to about 90 percent of the gum composition, and preferably from about 50 to about 80 percent.

High-intensity sweeteners may also be present and are commonly used with sugarless sweeteners. When used, high-intensity sweeteners typically constitute from about 0.001 to about 5 percent by weight of the chewing gum, preferably from about 0.01 to about 1 percent by weight of the chewing gum. Typically, high-intensity sweeteners are at least twenty times sweeter than sucrose. These may include, but are not limited to sucralose, aspartalne, salts of acesulfame, alitame, saccharin and its salts, cyclanmic acid and its salts, glycyrrnizin, dilydrochalcones, thaumatin, monellin and the like, alone or in combination.

The water-soluble portion of the chewing gum may further comprise softeners, flavoring agents and combinations thereof. Softeners are added to the chewing gum in order to optimize the chewability and mouth feel of the gum. The softeners, which are also known as plasticizers or plasticizing agents, generally constitute from about 0.5 to about 15 percent of the chewing gum. Softeners contemplated by the present invention include glycerin, lecithin and combinations thereof. Further, aqueous sweetener solutions such as those containing sorbitol, hydrogenated starch hydrolysates, corn syrup and combinations thereof may be used as softeners and binding agents in chewing gum.

The flavoring agent used in the gum may be present in an amount within the range of from about 0.1 to about 15 percent by weight of the chewing gum, preferably from about 0.2 to about 5 percent by weight of the chewing gum and most preferably from about 0.5 to about 3 percent by weight of the chewing gum. Flavoring agents may include essential oils, synthetic flavors or mixtures thereof, including but not limited to oils derived from plants and fruit such as citrus oils, fruit essences, peppermint oil, spearmint oil, other mint oils, clove oil, oil of wintergreen, cinnamon, anise and the like. Artificial flavoring agents and components are also contemplated for use in chewing gums of the present invention. Those skilled in the art will recognize that natural and artificial flavoring agents may be combined in any sensorally acceptable fashion. All such flavors and flavor blends are contemplated by the present invention However. mint flavors appear to have tile best enhancement by use of the present invention and thus are preferred. Most preferred is peppermint flavor. Peppermint flavor includes large amounts of menthol and menthone.

Optional ingredients such as colors, emulsifiers and pharmaceutical agents may also be included in chewing gum.

In general, chewing gum is manufactured by sequentially adding the various cheering gum ingredients to a commercially available mixer known in the art. After the ingredients have been thoroughly mixed, the gun the mass is discharged from the mixer and shaped into the desired form by one of several methods, including rolling into sheets and cutting into sticks, extruding into chunks or casting into pellets.

Generally, the ingredients are mixed by first melting the gum base and adding it to the running mixer. The base may also be melted in the mixer itself. Color or emulsifiers may be added at this time. A softener such as glycerin may also be added at this time, along with syrup and a portion of the bulking agent. Further portions of the bulking agent may then be added to the mixer. The flavoring agent is typically added with the final portion of the bulking agent. The entire mixing procedure typically takes from 5 to 15 minutes, but longer mixing may sometimes be required.

In practicing the present invention, hydroxypropyl cellulose is incorporated directly into the gum composition in its natural powder form, as opposed to being premixed with another ingredient or used as an encapsulant or an agglomerating agent. The addition of HPC to chewing gum in this particular manner results in release of some flavor components of the chewing gum more readily Generally, between about 0.005 and about I percent HPC may be used, preferably between about 0.01 and about 0.6 percent and most preferably between about 0.1 and 0.4 percent. The level of HPC added to the chewing gum composition effects the release of flavor. As the level of HPC increases, more flavor is released. However, the use of HPC at levels greater than about 1 percent resulted in chewing gum that lost its integrity and dissolved.

Hydroxypropyl cellulose is commercially available from Hercules, Inc. of Wilmington, Delaware under the trade name KLUCEL. Hydroxypropyl cellulose is available as a food grade material at various molecular weight (MW) ranges. For example, KLUCEL HF has a molecular weight range of about 50,000 to about 1,500,000, KLUCEL GF has a molecular weight range of about 100,000 to about 500,000; and KLUCEL El has a molecular weight range of about 60,000 to about 100,000. The different molecular weights of HPC have different effects on the release of the flavor components. For example, low molecular weight HPC gives a faster, early release of menthol, menthonc and other similar flavors, whereas higher molecular weight HPC gives a slower, late release of the flavor components. Tests indicated, however, that after 40 minutes of chewing, the level of release was virtually the same, regardless of the molecular weight of the HPC used. Thus, the HPC used in the present invention preferably has a molecular weight range between about 60,000 and about 1,500,000.

A wide range of changes and modifications to the embodiments of the invention described above will be apparent to persons skilled in the art. The following examples are not to be construed as imposing limitations on the invention, but are included merely to illustrate preferred embodiments.

EXAMPLES A and 1

| Ingredient | Comparative Example A | Example 1 |
| --- | --- | --- |
| Gum base | 19.70 | 19.70 |
| Sugar | 54.55 | 53.55 |
| Syrup-45.5 Be | 13.30 | 13.30 |
| Dextrose monohydrate | 9.90 | 9.90 |
| Glycerin | 1.40 | 1.40 |
| Lecithin | 0.25 | 0.25 |
| Peppermint flavor | 0.90 | 0.90 |
| High MW HPC | — | 0.60 |

Sensory evaluation of Comparative Example A and Example 1 indicated that tile peppermint flavor of Example 1 was much stronger had more of a cooling effect and was more bitter than the flavor of Comparative Example A.

Chew Out tests at 0, 5, 10, 20 and 40 minutes were done using Comparative Example A and Example 1 to analyze six chemicals found in natural peppermint oil. The tests showed that two of the components—namely, menthol and menthone,—released more readily from the chewing gum composition containing HPC (Example 1). Three of the remaining components, namely, menthylacetate and alpha- and beta-pinene, released more slowly from chewing gum containing HPC. At each time interval, the examples were analyzed for the amount of each flavor component left in the gum bolus. Table 1 shows the percentage of flavor released from Comparative Example A and Example 1 after 40 minutes of chewing.

TABLE 1

| Ingredient | Percent Release Comparative Example A | Percent Release Example 1 | Percent Change |
|---|---|---|---|
| alpha-pinene | 187 | 8.5 | −55 |
| beta-pinene | 17.3 | 7.3 | −58 |
| Eucalyptol | 28.9 | 294 | +2 |
| Menthone | 19.7 | 24.5 | +24 |
| Menthol | 24.9 | 323 | +30 |
| Menthylacetate | 4.2 | 2.9 | −31 |

The results in Table 1 show that the flavor release characteristics are significantly modified by the addition of low levels of HPC Analvsis suggests that the more hydropilic flavor components may be released from chewing gum faster than the hydrophobic flavor components when HPC is present in the gum.

Sensory, effects of these flavor components were also noted Typically. flavors such as menthol and menthone give chewing gum its characteristic flavor properties When the release of these flavors is modified by the addition of HPC to the chewing gum, the sensory perception is that the flavor is stronger and cooler.

panelists determined the levels of flavor, bitterness, coolness and sweetness at 1, 3, 5, 7, 9, 11, 13, and 15 minutes of chewing and found no statistical difference between Comparative Example B and Example 2 and between Comparative Example B and Example 4 The panelists did note, however, a trend of more cooling and flavor, with less bitterness, in the inventive samples.

EXAMPLES C-D and 8

| Ingredient | Comparative Example C | Comparative Example D | Example 8 |
|---|---|---|---|
| Gumbase | 19.70 | 19.70 | 19.70 |
| Sugar | 54.65 | 54.75 | 54.35 |
| Syrup-45.5 Be | 13.30 | 13.30 | 13.30 |
| Dextrose monohydrate | 9.90 | 9.90 | 9.90 |
| Glycerin | 1.30 | 1.30 | 1.30 |
| Lecithin | 0.25 | 0.25 | 0.25 |
| Peppermint flavor | 0.90 | 0.80 | 0.80 |
| High MW HPC | — | — | 0.20 |
| Low MW HPC | — | — | 0.20 |

Sensory evaluation of Comparative Examples C–D and Example 8 indicated that the lower level of flavor (Comparative Example D) results in a lower flavor intensity, less coolness and less bitterness. The addition of HPC, however, increased the flavor and coolness, making it similar to Comparative Example C. Thus, HPC can give gum formulations the impression of more flavor and of more intense cooling even when there actually is less flavor in the gum composition.

It should be appreciated that the methods arid compositions of the present invention are capable of being incorporated in the form of a variety of embodiments, only a few of which have been illustrated and described above. The invention may be embodied in other forms without departing from EXAMPLES B and 2-7

| Ingredient | Comparative Example B | Example 2 | Example 3 | Example 4 | Example 5 | Example 6 | Example 7 |
|---|---|---|---|---|---|---|---|
| Gum base | 19.60 | 19.60 | 19.60 | 19.60 | 19.60 | 19.60 | 19.60 |
| Sugar | 54.75 | 54.65 | 54.65 | 54.65 | 54.45 | 54.45 | 54.45 |
| Syrup-45.5 Be | 13.30 | 13.30 | 13.30 | 13.30 | 13.30 | 13.30 | 13.30 |
| Dextrose monohydrate | 9.90 | 9.90 | 9.90 | 9.90 | 9.90 | 9.90 | 9.90 |
| Glycerin | 1.30 | 1.30 | 1.30 | 1.30 | 1.30 | 1.30 | 1.30 |
| Lecithin | 0.25 | 0.25 | 0.25 | 0.25 | 0.25 | 0.25 | 0.25 |
| Peppermint flavor | 0.90 | 0.80 | 0.80 | 0.80 | 0.80 | 0.80 | 0.80 |
| High MW HPC | — | 0.20 | — | — | 0.40 | — | — |
| Med MW HPC | — | — | 0.20 | — | — | 0.40 | — |
| Low MW HPC | — | — | — | 0.20 | — | — | 0.40 |

In Comparative Example B and Examples 2–7. the flavor level was reduced slightly to determine if less flavor could be used with the added HPC and still obtain the same intensity of flavor. Formal sensory evaluation indicated that the level of flavor was too high when the gum contained 0.40 percent HPC and 0.80 percent flavor (Examples 5–7). The level of flavor intensity and the level of coolness intensity were good. and the overall bitterness reduced, in chewing gums containing 0.20 percent HPC and 0.80 percent flavor (Examples 2–4). Time-intensity tests using nine trained its spirit or essential characteristics. It will be appreciated that the addition of some other ingredients, process steps, materials or components not specifically included may have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A chewing gum product made from a chewing gum composition having increased flavor release comprising:
   a) about 5% to about 95% by weight gum base;
   b) about 5% to about 95% by weight bulking and sweetening agents,
   c) about 0,1% to about 15% by weight flavor, and
   d) about 0.005% to about 1% by weigh hydroxypropyl cellulose, wherein said hydroxypropyl cellulose is incorporated directly into the chewing gum composition in a powder form which has not been premixed with another ingredient.

2. The chewing gum product of claim 1 wherein the bulkling and sweetening agents comprise sugar and glucose syrup.

3. The chewing gum product of claim 1 wherein the flavor is a mint flavor.

4. The chewing gum product of claim 3 wherein the mint flavor is peppermint.

5. The chewing gum product of claim 1 wherein said hydroxypropyl cellulose has a molecular weight in the range of from about 60,000 to about 100,000.

6. The chewing gum product of claim 1 wherein said hydroxypropyl cellulose has a molecular weight in the range of from about 100,000 to about 500,000.

7. The chewing gum product of claim 1 wherein said hydroxypropyl cellulose has a molecular weight in the range of from about 500,000 to about 1,500,000.

8. The chewing gum product of claim 1 wherein said hydroxypropyl cellulose is present at a level of about 0.01% to about 0.6% by weight of the total gum product.

9. The chewing gum product of claim 1 wherein said hydroxypropyl cellulose is present at a level of about 0.1% to about 0.4% by weight of the total gum product.

10. The chewing gum product of claim 1 wherein the chewing gum product is a sugarless chewing gum.

11. The chewing gum product of claim 10 wherein the flavor is a mint flavor.

12. The chewing gum product of claim 11 wherein the mint flavor is peppermint.

13. The chewing gum product of claim 12 wherein said hydroxpropyl cellulose is present at a level of about 0.01% to about 0.6% by weight of the total gum product.

14. The chewing gum product of claim 12 wherein said hvdroxypolyl cellulose is present at a level of about 0.01% to about 0.4% by weight of the total gun product.

15. The chewing gum product of claim 1 wherein the flavor comprises menthone and menthol, and the hydroxypropyl cellulose comprises from about 0.2% to about 1% of the composition and is effective to increase the release of the menthone and menthol as the product is chewed.

16. The chewing gum product of claim 15 wherein the hydroxypropyl cellulose is effective such that after 40 minutes of chewing the level of release of menthone is increased by about 24% compared to the same composition without hydroxypropyl cellulose.

17. The chewing gum product of claim 1 wherein the level of flavor included in the product is less than x and the product has a flavor intensity similar to the product made with a level of x amount of flavor, but without hydroxypropyl cellulose.

18. The chewing gum product of claim 17 wherein the product includes about 0.8% peppermint flavor and has a flavor intensity similar to a product made with about 0.9% peppermint flavor but without the hydroxypropyl cellulose.

19. A method of increasing the release of flavor from a chewing gum composition comprising the step of adding hydroxypropyl cellulose in a powder form which has been premixed with another ingredient, directly into the chewing gum composition.

20. A method of making a chewing gum product with increased flavor release comprising the steps of:
   a) forming a chewing gum composition comprising from about 5% to about 95% gum base, from about 5% to 95% bulking and sweetening agents and from about 0.1% to about 15% flavor and
   b) adding from about 0.005% to about 1% hydroxypropyl cellulose in a powder form which has not been premixed with another ingredient directly into the chewing gum composition.

* * * * *

UNITED STATES PATENT AND TRADEMARK OFFICE
CERTIFICATE OF CORRECTION

| | |
|---|---|
| PATENT NO. | : 6,479,082 B1 |
| DATED | : November 12, 2002 |
| INVENTOR(S) | : Sonya S. Johnson et al. |

It is certified that error appears in the above-identified patent and that said Letters Patent is hereby corrected as shown below:

<u>Title page,</u>
Item [56], References Cited, U.S. PATENT DOCUMENTS, delete "Song" and substitute -- Song et al. -- in its place.

<u>Column 7,</u>
Line 10, immediately after "agents" delete "," (comma) and substitute -- ; -- (semicolon) in its place.
Line 11, immediately after "flavor" delete "," (comma) and substitute -- ; -- (semicolon) in its place.

<u>Column 8,</u>
Line 23, immediately after "flavor" delete "," (comma).
Line 32, after "has" insert -- not --.

Signed and Sealed this

Twenty-third Day of September, 2003

JAMES E. ROGAN
*Director of the United States Patent and Trademark Office*